United States Patent [19]

Kubota et al.

[11] 4,251,117

[45] Feb. 17, 1981

[54] HYDRAULIC PRESSURE CONTROL VALVE FOR DOUBLE PIPING BRAKING SYSTEM

[75] Inventors: Hitoshi Kubota, Fujisawa; Katsuyuki Yoshizawa, Hachioji both of Japan

[73] Assignee: Nissan Motor Company, Limited, Yokohama, Japan

[21] Appl. No.: 36,723

[22] Filed: May 7, 1979

[30] Foreign Application Priority Data

May 12, 1978 [JP] Japan ................................. 53-55456

[51] Int. Cl.$^3$ .............................................. B60T 8/26
[52] U.S. Cl. .................................. 303/24 F; 303/6 C
[58] Field of Search ................. 303/6 C, 22 R, 24 A, 303/24 C, 24 F, 84 A, 84 R

[56] References Cited

U.S. PATENT DOCUMENTS 4,053,185 10/1977 Carre .................................. 303/6 C

FOREIGN PATENT DOCUMENTS 2811005 10/1978 Fed. Rep. of Germany .......... 303/6 C

*Primary Examiner*—Duane A. Reger
*Attorney, Agent, or Firm*—Schwartz, Jeffery, Schwaab, Mack, Blumenthal & Koch

[57] ABSTRACT

Two parallelly arranged proportioning valve assemblies are installed in a housing. The assemblies have respective plungers which are movable against a common spring to slacken the rise of the hydraulic pressure issued from the assemblies with respect to that of the hydraulic pressure fed in the same. A deceleration sensing valve assembly is also installed in the housing so as to regulate the magnitude of a load applied to the common spring in accordance with the degree of deceleration of the vehicle.

9 Claims, 3 Drawing Figures

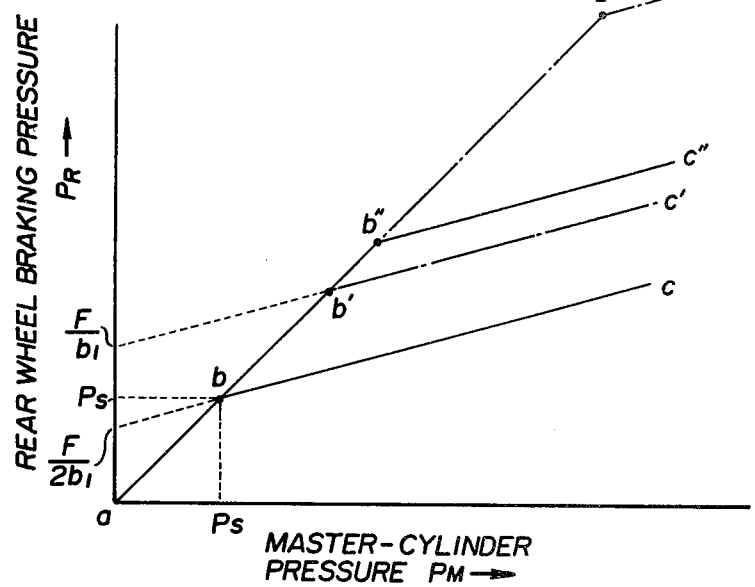
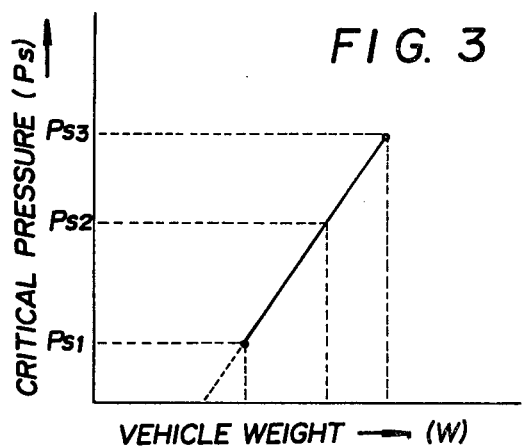

HYDRAULIC PRESSURE CONTROL VALVE FOR DOUBLE PIPING BRAKING SYSTEM

FIELD OF THE INVENTION

The present invention relates in general to an antiskid braking system for a motor vehicle, and more particularly to a hydraulic pressure control valve assembly for a so-called double piping braking system which functions to control the rise of the hydraulic pressure issued therefrom with respect to that of the hydraulic pressure fed therein.

BACKGROUND OF THE INVENTION

Nowadays, a double piping braking system comprising two braking systems in a motor vehicle is popular due to its higher security at the time of brake trouble. In such system, the following two methods are usually put into practical use, that is, a method in which the braking system is so constructed that the hydraulic pressure issued from one of the outlets to a tandem-master-cylinder is supplied to the right front wheel brake cylinder and the left rear wheel brake cylinder and the pressure from the other outlet is supplied to the left front wheel brake cylinder and the right rear wheel brake cylinder, and a method in which two brake cylinders are provided on each of the right and left front wheels and the braking system is so constructed that the hydraulic pressure from one of the outlets of the master-cylinder is supplied to one of the respective right and left front wheel brake cylinders and the left rear brake cylinder, and the pressure from the other outlet is supplied to the other of the respective right and left front wheel brake cylinders and the right rear wheel brake cylinder.

The former method is known as X-piping and the latter as J—J-piping. In either piping method, it is necessary to provide a hydraulic pressure control valve assembly, such as a limiter valve assembly or a proportioning valve assembly, in the respective hydraulic pressure supply lines to the rear wheel brake cylinders because of compensation of effective weight transfer of the motor vehicle during braking of the same. Therefore, the conventional double piping brake system requires two hydraulic pressure control valve assemblies. This causes disadvantage in respect of both mounting space and assemblage property.

Accordingly, there has been suggested a valve assembly for the double piping braking system wherein a pair of proportioning valve assemblies performing the respective hydraulic pressure control for the rear wheel braking systems are arranged in a single housing parallelly with each other, the respective plunger members of the valve assemblies being stressed by a common spring via a common spring seat. In such proportioning valve assemblies, however, the hydraulic pressure at the beginning to slacken the rise of the rear wheel braking pressure, that is, the critical pressure is constant thereby causing the distribution characteristic of the front and rear wheel braking force constant.

As is well known in the art, in order to obtain such an ideal distribution characteristic of the front and rear wheel braking force that enables the front and rear wheels to lock simultaneously, the braking force distribution should be varied with the change of the vehicle weight, and the above-mentioned critical hydraulic pressure should become higher with increase of the vehicle weight. In this sense, the hydraulic pressure control valve assembly of the above-mentioned type is not suitable to large-sized trucks and the like the weight of which varies greatly depending on whether they are empty or loaded.

OBJECTS OF THE INVENTION

Therefore, an essential object of the present invention is to provide a hydraulic pressure control valve assembly for a double piping braking system, which is free of the aforementioned drawbacks.

It is an object of the present invention to provide a hydraulic pressure control valve assembly for a double piping braking system, which has therein two parallelly arranged proportioning valve assemblies and also a deceleration sensing valve assembly, the deceleration sensing valve assembly functioning to raise the critical hydraulic pressure issued from each of the proportioning valve assemblies in proportion to the increase of the vehicle weight.

It is another object of the present invention to provide a hydraulic pressure control valve assembly for a double piping braking system, which has therein two parallelly arranged proportioning valve assemblies, a deceleration sensing valve assembly and a switching valve assembly, the switching valve assembly functioning to avoid possible inconvenience in that malfunction of one braking system connected to one of the proportioning valve assemblies causes malfunction of the other braking system connected to the other proportioning valve assembly.

BRIEF DESCRIPTION OF THE DRAWINGS

Other objects and advantages of the present invention will become clear from the following description when taken in conjunction with the accompanying drawings, in which:

FIG. 2 is a graph depicting the relationship between the hydraulic pressure fed into the valve assembly of the invention and the hydraulic pressure issued from the same; and FIG. 3 is a graph depicting the relationship between the vehicle weight and the critical hydraulic pressure.

DESCRIPTION OF THE PREFERRED EMBODIMENT

Figure 1:
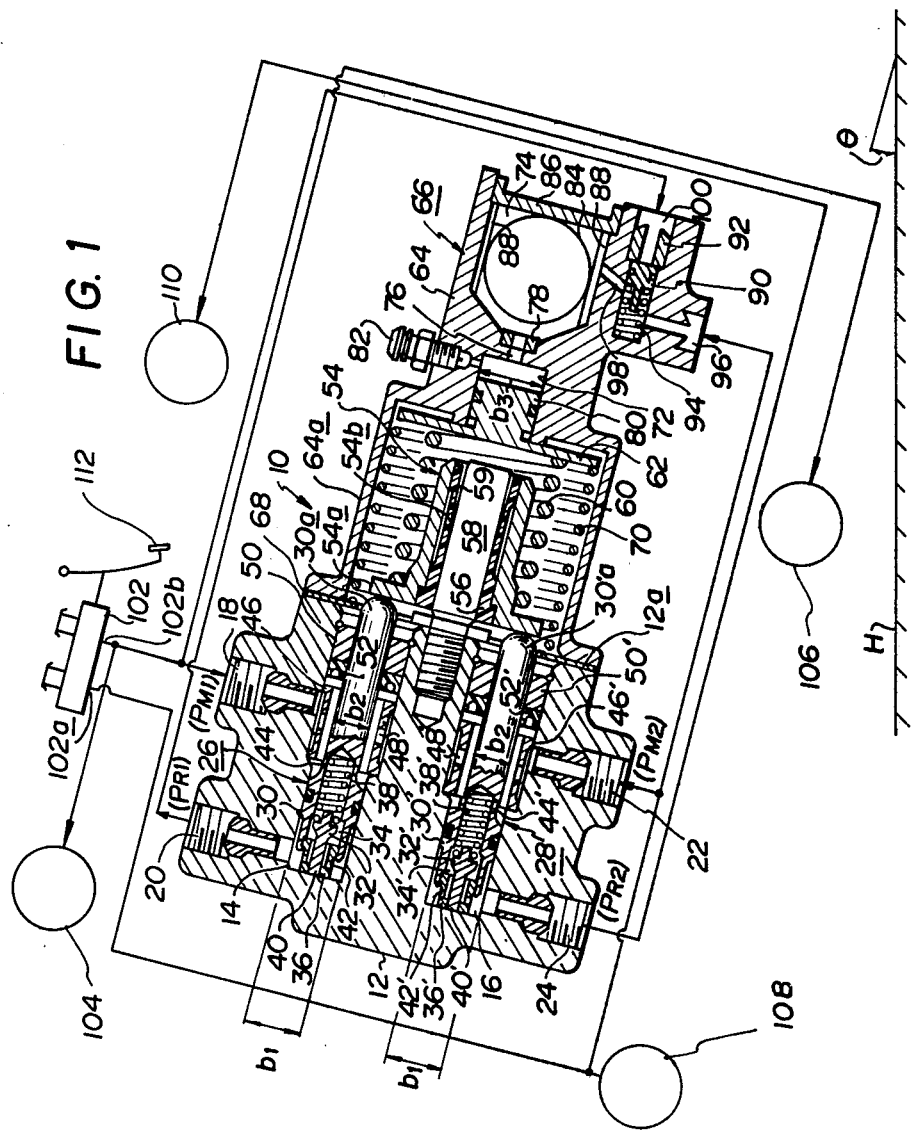
FIG. 1 is a vertical section view of a hydraulic pressure control valve assembly of the present invention, showing installation manner of the valve assembly in a motor vehicle double piping hydraulic braking system.

Referring to FIG. 1, there is illustrated a hydraulic pressure control valve assembly of the present invention, which is generally designated by numeral 10. The valve assembly 10 comprises a housing 12 in which a first plunger chamber 14 and a second plunger chamber 16 are formed. These chambers 14 and 16 are in parallel and opened in an end surface 12a of the housing 12. In the housing 12, there are further formed a first inlet port 18 and a first outlet port 20 which lead to the plunger chamber 14, and a second inlet port 22 and a second outlet port 24 which lead to the plunger chamber 16. In the plunger chambers 14 and 16, there are provided a first control valve assembly 26 and a second control valve assembly 28, respectively, for communicating and interrupting flow between the inlet and outlet ports 18 and 20 and between the inlet and outlet ports 22 and 24.

The control valve assemblies 26 and 28 are proportioning valve assemblies of identical construction. A plunger 30 or 30' is inserted into the plunger chamber 14 or 16 and a poppet valve 32 or 32' is arranged within a blind hole 34 or 34' of the plunger 30 or 30'. Fixed to the opening end of the blind hole 34 or 34' via caulking is a valve seat 36 or 36', toward which the poppet valve 32 or 32' is stressed by a spring 38 or 38'. When the plunger 30 or 30' moves to the right in the drawing, the poppet valve 32 or 32' closes by the action of the spring 38 or 38'. The length of the stem part 40 or 40' of the poppet valve 32 or 32' is determined so as to project from the left side of the valve seat 36 or 36' upon closing of the poppet valve 32 or 32'.

In the valve seat 36 or 36', through holes 42 or 42' are pierced for communication of the plunger chamber 14 or 16 with the blind hole 34 or 34', and in the plunger, through holes 44 or 44' are pierced for communication of the blind hole 34 or 34' with the inlet port 18 or 22. The plunger chamber 14 or 16 tightly receives therein a sleeve 46 or 46' which surrounds a decreased diameter part of the plunger 30 or 30' with a clearance therebetween as shown. Through holes 48 or 48' are provided in the sleeve 46 or 46' so as to form a passage from the inlet port 18 or 22 to the outlet port 20 or 24 through the holes 48 or 48, the holes 44 or 44', the blind hole 34 or 34' and the holes 42 or 42'.

The plunger 30 or 30' is projected from the opening end of the plunger chamber 14 or 16. The projected end 30a or 30'a of the plunger 30 or 30' is guided by a retainer 50 or 50' which is coupled in the plunger chamber 14 or 16 and sealed by a seal member 52 or 52'. The projected end 30a or 30'a of the plunger 30 or 30' is in contact with a flange section 54a of a cylindrical spring holder 54. The holder 54 receives a plastic bush 56 in a central hole 54b thereof. A guide rod 58 having a right section about which the bush 56 is slidably mounted is fixed to the housing 12. A spring 60 is arranged between a seal plate 62 opposite the free right end of the guide rod 58 and the flange section 54a of the spring holder 54. The spring 60 presses the plunger 30 or 30' of the control valve assembly 26 or 28 through the spring holder 54 for maintaining the poppet valve 32 or 32' in the opening position. By the reason which will become clear hereinlater, the sectional area of the central hole of the bush 56 at the right section thereof is gradually increased with increase of distance from the end 12a of the housing 12 to form a tapered clearance 59 between the right section of the guide rod 58 and the right section of the bush 56, as shown.

The spring 60 and the spring holder 54 are housed within a cylindrical hollow part 64a of a housing 64 of deceleration sensing valve assembly 66. The housing 64 is connected to the housing 12 through a seal plate 68. Within the cylindrical hollow part 64a is housed another spring 70, which is arranged between the spring seat 62 and the seal plate 68. In the housing 64 are formed a cylindrical chamber 72 opening into the interior of the cylindrical hollow part 64a, and a ball chamber 74. The chambers 72 and 74 communicate through a passage 76 formed in the housing 64. A rubber valve seat 78 is fixed to the opening end of the passage 76 at a section facing the chamber 74.

A piston 80 molded integrally with the before-mentioned spring seat 62 is slidably disposed in the cylindrical chamber 72. An air bleed valve 82 is fixed to the housing 64 to communicate with the cylindrical chamber 72. A ball 84 is slidably disposed in the ball chamber 74. The ball chamber 74 is capped with a lid 86. A suitable number of grooves 88 is formed in the wall of the ball chamber 74 for communicating spaces (no numerals) formed in the front and rear of the ball 84. In the housing 64 is further provided a switching valve comprising a sliding piston 90. The piston 90 is maintained in contact with a stopper 92 by a spring 94 for communicating an inlet port 96 with the ball chamber 74 through a passage 98. The switching valve switches to communicate another inlet port 100, in which the stopper 92 is screwed, with the ball chamber 74 through the passage 98, when the piston 90 moves to the left, as in FIG. 1, against the spring 94.

When the hydraulic pressure control valve assembly 10 of the invention is equipped on the vehicle body, it is so slanted with respect to the horizontal plane "H" that under normal state of the assembly 10, the ball 84 will be in contact with the lid 86 by its own gravity, as shown in FIG. 1, in particular, it is slanted with an angle "$\theta$" with respect to the horizontal plane "H."

In the practical use of the valve assembly 10, the ports 96 and 100 are respectively connected to the outlet ports 102a and 102b of a tandem-master-cylinder 102, the inlet port 18 is connected to a right front wheel brake cylinder 104 and the outlet port 102b of the tandem-master-cylinder 102, the outlet port 20 is connected to the left rear wheel brake cylinder 106, the inlet port 22 is connected to the left front wheel brake cylinder 108 and the other outlet port 102a of the master-cylinder 102, and the outlet port 24 is connected to the right rear wheel brake cylinder 110 respectively.

Designated by numeral 112 is a brake pedal for operating the master-cylinder 102. Similarly to a conventional proportioning valve, each plunger 30 or 30' has a section of the diameter $b_1$ and a section of the diameter $b_2$ in which $b_1$ is greater than $b_2$, that is $b_1 > b_2$.

In operation, when the brake pedal 112 is depressed to cause the master-cylinder 102 to form hydraulic pressures $P_{M1}$ and $P_{M2}$ at the outlet ports 102b and 102a, the pressures $P_{M1}$ and $P_{M2}$ are supplied to the right front wheel brake cylinder 104 and the inlet port 18, the left front wheel brake cylinder 108 and the inlet port 22, respectively. These master-cylinder pressures $P_{M1}$ and $P_{M2}$ are also supplied to the corresponding rear wheel brake cylinders 106 and 110 because at the initial state of the master-cylinder operation, the poppet valves 32 and 32' are kept open. Thus, in this stage, the front and rear wheel braking hydraulic pressures rise with the characteristic shown by "a–b" in FIG. 2. The balance equation of the force applied on the respective plungers 30 and 30' at this time is given as follows, in which the force generated by the spring 60 is represented by "F."

$$P_M \cdot b_2 = \tfrac{1}{2} F \tag{1}$$

(Here, $P_{M1} = P_{M2} = P_M$)
$$\therefore P_M = F/2b_2 \tag{2}$$

(Here, $P_M = P_{R1} = P_{R2} = P_R$)

Then, when the pressure by the brake pedal 112 is increased to raise the $P_M$ to a degree to satisfy the following equation, $$P_M \cdot b_2 > \tfrac{1}{2} F \tag{3}$$

the plungers 30 and 30' move rightward against the spring 60 and the poppet valves 32 and 32' close, thereby interrupting the communications between the inlet and outlet ports 18 and 20, 22 and 24, so that the pressure supply to the rear wheel brake cylinders 106 and 110 is blocked. In this stage, the following balance equation is given:

$$P_M(b_1-b_2)+\tfrac{1}{2}F=P_R\cdot b_1 \quad (4)$$

$$P_R=(b_1-b_2/b_1)\cdot P_M+F/2b_1 \quad (5)$$

If the brake pedal 112 is depressed further to still more raise the master-cylinder output pressure $P_M$, the plungers 30 and 30' return to their initial positions and the poppet valves 32 and 32' open again, whereby the rear wheel braking pressures will rise with a smaller slope $b_1-b_2/b_1$, with respect to the rise of the master-cylinder pressure $P_M$, as shown by "b-c" in FIG. 2. Thus, the unwanted rear wheel skidding is prevented.

Assuming that one of the systems, for example, the system corresponding to the left front wheel brake cylinder 108 fails to operate, the proportioning valve 28 does not operate at all, remaining in the state of FIG. 1. However in the other system, that is the system corresponding to the right front wheel braking cylinder 104, when the plunger 30 moves rightward against the spring 60 due to the rise of the master-cylinder pressure $P_M$, the spring holder 54 inclines gradually at its pivot to the part where it is contacted with the plunger 30'. This inclination is permitted by the tapered clearance 59 defined between the guide rod 58 and the bush 56. Then, the spring holder 54, more specifically the flange section 54a of it moves apart from the projected end 30'a of the plunger 30' and slides with the bush 56 on the guide rod 58, whereby the poppet valve 32 closes. At this time, the spring 60 acts on only the proportioning valve assembly 26. Thus, the following relation is established:

$$P_R=(b_1-b_2/b_1)\cdot P_M+F/b_1 \quad (6)$$

and thus, a large braking force as shown by "a-b'-c'" in FIG. 2 is obtained by only a single system which at this time incorporates with the right front wheel braking cylinder 104, thus compensating for insufficiency of the braking force originating from the malfunction of the other system.

On the other hand, when the master-cylinder pressure $P_M$ rises, the braking force "B" will also rise, and the deceleration "$\alpha$" which is obtained by dividing the braking force "B" with the vehicle weight "W" will also increase, as is clear from the following equation:

$$B=C\cdot P_M \quad (7)$$

(Here, C is a constant)

$$\alpha/g=B/W \quad (8)$$

(Here, g is gravitational acceleration)

When the deceleration ratio "$\alpha/g$" reaches a predetermined value which is determined by the sloping angle "$\theta$" of the valve assembly 10 with respect to the horizontal plane "H," that is, $$(\alpha/g)_o=f(\theta) \quad (9)$$

($f(\theta)$: function of "$\theta$"), the ball 84 moves leftward in FIG. 1 by its inertia against the component of force of the gravitational acceleration in the direction of the sloping angle "$\theta$" to block the opening of the valve seat 78. Thus, under this condition even if the master-cylinder pressure $P_M$ increases further, the pressure applied to the piston 80 is maintained at the same as that at the time when the ball 84 closes the opening of the valve seat 78. The pressure $P_G$ in the chamber 72 at this time will be represented by the following equation:

$$P_G=(f(\theta)/C)\cdot W \quad (10)$$

The force pushing the piston 80 to the left in FIG. 1, which is represented by a product of the pressure $P_G$ and the pressure receiving area "$b_3$" of the piston 80, balances with the sum of the forces "F" and "F'" of the springs 60 and the spring 70, and the following equation is obtained:

$$F+F'=P_G b_3=(f(\theta)/C)b_3 W \quad (11)$$

The force "F" acts to push the plungers 30 and 30' to the left in FIG. 1, and the force "F'" is received by the seal plate 68 interposed between the housings 12 and 64.

On the other hand, the forces "F" and "F'" are respectively obtained by adding the values obtained by the products of the moved distance "$\Delta x$" of the piston 80 and the constants $k_1$ and $k_2$ of the springs 60 and 70 to the set loads "$f_1$" and "$f_2$" of the springs 60 and 70 at the time of $P_M=0$. Thus, the relation between "F" and "F'" is represented as follows:

$$F' = f_2 + \frac{k_2}{k_1}\cdot(F-f_1) \quad (12)$$

From the equations (11) and (12), the following is obtained, $$F = \frac{\frac{f(\theta)}{C}b_3 W - (f_2-\frac{k_2}{k_1}\cdot f_1)}{1+\frac{k_2}{k_1}} \quad (13)$$

The critical pressure "$P_s$" is represented from the equation (2) as follows:

$$P_s = \frac{F}{2b_2} \quad (14)$$

When the equation (13) is put into this equation, the following is obtained:

$$P_s = \frac{\frac{f(\theta)}{C}b_3 W - (f_2-\frac{k_2}{k_1}\cdot f_1)}{2b_2(1+\frac{k_2}{k_1})} \quad (15)$$

If $(f_2-(k_2/k_1)\cdot f_1)>0$ is established, the relation of the critical pressure "$P_s$" with respect to the vehicle weight "W" will be obtained as is shown in FIG. 3. As is clear from this graph, with the increase of the vehicle weight "W," the critical pressure $P_s$ rises.

As the split point "b," shown in FIG. 2, rises with the increase of the load on the vehicle, the rear wheel braking pressures "$P_R$" rise. For example in the case of a half loading, the pressures "$P_R$" rise with the characteristic indicated by "a-b''-c'''", which is substantially the ideal for rear wheel braking pressure.

When one braking system fails to operate in a thus loaded vehicle, the force of the spring 60 is applied entirely to the plunger 30 (or 30') of the normally operating other braking system, as similar to the aforementioned case, thereby raising the rear wheel braking pressure of the braking system largely in a manner as indicated by "a-b'''-c''''" in FIG. 2, so that the trouble originating from the operation failure of one braking system can be compensated in such case.

As is clear from the foregoing, the pressure control valve assembly 10 of the present invention in which a deceleration sensing valve assembly 66 is equipped for raising the critical pressure with the increase of the vehicle weight, is such featured that the distribution characteristic of the front and rear wheel braking force becomes closer to the ideal one, the critical pressure can be widened over a large range in spite of employing parallelly arranged two proportioning valve assemblies which tend to cause an insufficiency of the rear wheel braking pressure, and the pressure applied to the brake pedal by a driver is reduced.

Now, according to the present invention, the mastercylinder pressures for the both braking systems are introduced to the deceleration sensing valve assembly 66 through the switching valve with piston 90. Thus, it is possible to avoid possible inconvenience in that one braking system which fails to operate causes the other braking system to fail to operate normally and also possible to function the deceleration sensing valve assembly 66 normally at such occasion. This will be well understood from the following.

When, for example, one braking system connected to the port 100 fails to operate causing a stop of the pressure supply to the port 100, the piston 90 of the switching valve takes the position shown in FIG. 1 by the action of the spring 94, supplying positively the pressure of the other normally operating braking system to the deceleration sensing valve assembly 66 without flowing out through the port 100 to the malfunctioning braking system. On the other hand, when a braking system connected to the port 96 fails to operate, the piston 90 of the switching valve is moved leftward in FIG. 1 against the spring 94 by the pressure supplied to the port 100 from a normally operating braking system, thereby switching the communication between the ports 96 and 98 to that between the ports 100 and 98. Thus, the pressure introduced to the port 100 is supplied positively to the deceleration sensing valve assembly 66.

What is claimed is:

1. A hydraulic pressure control valve assembly for a double piping braking system of a wheeled vehicle, comprising two parallelly arranged proportioning valve assemblies which are respectively provided with plungers which are axially movable in a direction against a common spring in response to application of hydraulic pressure to respective inlet ports to control the magnitude of hydraulic pressure in respective outlet ports, which is characterized by a deceleration sensing valve assembly which detects deceleration of the vehicle and operates to increase the load applied to said common spring in reverse proportion to the degree of deceleration of the vehicle.

2. A hydraulic pressure control valve assembly as claimed in claim 1, characterized in that said deceleration sensing valve assembly comprises a piston supporting an end of said common spring, a chamber member in which said piston is slidably disposed to form an expandable chamber which is communicable with said inlet ports, and means for enabling said expandable chamber to contain therein a fluid the pressure of which is dependent on the degree of deceleration of said vehicle.

3. A hydraulic pressure control valve assembly as claimed in claim 2, characterized in that said means is a ball valve comprising ball, a ball chamber in which said ball is loosely disposed, a first passage connecting said ball chamber with said expandable chamber, a second passage connecting said inlet ports with said ball chamber, and a valve seat fixed to said first passage at a section facing said ball chamber.

4. A hydraulic pressure control valve assembly as claimed in claim 3, characterized in that a switching valve is interposed in said second passage in a manner to switch the connections between one of said inlet ports and said ball chamber and between the other of said inlet ports and said ball chamber upon occurrence of a predetermining magnitude of pressure difference between said inlet ports.

5. A hydraulic pressure control valve assembly as claimed in claim 4, characterized in that said switching valve comprises a piston chamber having first, second and third openings which are respectively connected to said ball chamber, one of said inlet ports and the other of said inlet ports, a piston slideably disposed in said piston chamber so as to block one of the connections when taking a first position and so as to block the other connection when taking a second position, and a spring urging said piston to take one of said first and second positions when the predetermined magnitude of pressure difference is absent.

6. A hydraulic pressure control valve assembly for a double piping braking system of a wheeled vehicle, comprising two parallelly arranged proportioning valve assemblies which are respectively provided with plungers which are axially movable in a direction against a common spring in response to application of hydraulic pressure to respective inlet ports to control the magnitude of hydraulic pressure in respective outlet ports, which is characterized by a deceleration sensing valve assembly which regulates the magnitude of a load applied to said common spring in accordance with the degree of deceleration of said vehicle, said deceleration sensing valve assembly including a piston supporting an end of said common spring, a chamber member in which said piston is slideably disposed to form an expandable chamber which is communicable with said inlet ports, and means for enabling said expandable chamber to contain therein a fluid the pressure of which is dependent on the deggree of deceleration of said vehicle.

7. A hydraulic pressure control valve assembly as claimed in claim 6, which is further characterized in that said means is a ball valve including a ball, a ball chamber in which said ball is loosely held, a first passage connecting said ball chamber with said expandable chamber, a second passage connecting said inlet ports with said ball chamber, and a valve seat fixed to said first passage at a section facing said ball chamber.

8. A hydraulic pressure control valve assembly as claimed in claim 7, which is characterized in that a switching valve is interposed in said second passage in a manner to switch the connections between one of said inlet ports and said ball chamber and between the other of said inlet ports and said ball chamber upon occurrence of a predetermined magnitude of pressure difference between said inlet ports.

9. A hydraulic pressure control valve assembly as claimed in claim 8, which is characterized in that said switching valve comprises a piston chamber having first, second and third openings which are respectively connected to said ball chamber, one of said inlet ports and the other of said inlet ports, a piston slideably disposed in said piston chamber so as to block one of the connections when taking a first position and so as to block the other connection when taking a second position, and a spring urging said piston to take one of said first and second positions when the predetermined magnitude of pressure difference is absent.

* * * * *